United States Patent Office 2,834,813
Patented May 13, 1958

2,834,813
SYNTHESIS OF VITAMIN A

William Oroshnik, Plainfield, N. J., assignor to Ortho Pharmaceutical Corporation, a corporation of New Jersey No Drawing. Application April 21, 1953
Serial No. 350,250

13 Claims. (Cl. 260—611)

This invention relates to compositions of matter and to methods for preparing the same. This invention particularly relates to compounds which are derivatives of α-ethynyl-β-ionol and to methods of preparing the said derivatives.

It is an object of this invention to prepare compounds to be used as intermediates in the preparation of compounds having vitamin A activity.

It is another object of this invention to prepare compounds having the same number of carbon atoms and the same configuration with respect to carbon atoms as vitamin A ethers or esters.

It is another object of this invention to prepare hydroxy compounds having the same number of carbon atoms and the same configuration with respect to carbon atoms as vitamin A ethers or esters.

It is still another object of this invention to prepare a hydroxy compound having the same number of carbon atoms and the same configuration with respect to carbon atoms as vitamin A or a vitamin A ether which has vitamin A activity and marked stability to oxidation.

It is another and further object of this invention to prepare compounds having the same number of carbon atoms and the same configuration with respect to carbon atoms as vitamin A esters or ethers and the same number of hydrogen atoms as vitamin A esters or ethers.

It is another object of this invention to prepare compounds having vitamin A activity.

Other objects of this invention will be apparent from the description following and from the appended claims.

In the "Journal of the American Chemical Society," volume 67, page 1627 (1945), the inventor disclosed that certain derivatives of α-ethynyl-β-ionol having value as intermediates in the preparation of synthetic compounds have vitamin A activity. This publication disclosed that a compound having the following formula

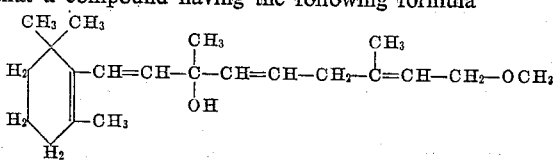

could be prepared by reacting α-ethynyl-β-ionol with a Grignard reagent and an ether of a 1,4 chlorohydrin of isoprene according to the following equation:

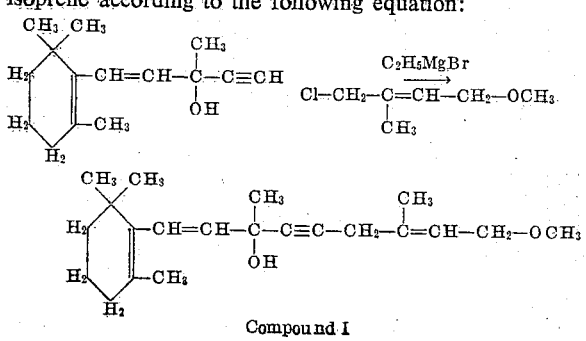

Compound I

The acetylenic compound could not be distilled without dehydration because of impurities which were present.

It has now been discovered that Compound I having the general formula

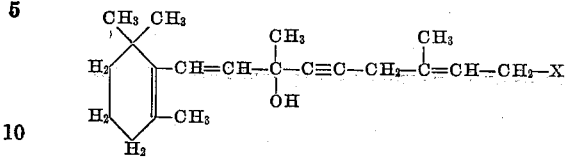

in which X is —OR or

and R is a lower alkyl radical, may be distilled in a vacuum in the absence of any traces of acidic substances, and when so distilled, there is substantially no dehydration during the distillation. If a trace of an acidic substance is present, Compound I is completely dehydrated during the distillation.

It has also been discovered that Compound I which has been vacuum distilled or crude undistilled Compound I may be treated with a strongly alkaline substance, such as sodium hydroxide in ethyl or methyl alcohol, any sodium alkoxide in alcohol, or a quaternary ammonium hydroxide, at room temperature, and that this brings about a shift in the position of a double bond. When X is

the ester linkage would be saponified; and when Compound I is so treated, it is preferred that X be —OR. The product of this alkali treatment is probably represented by the following formula

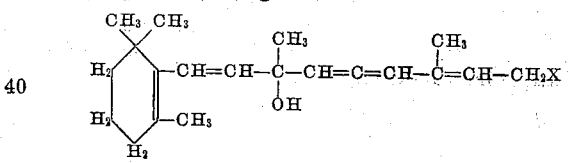

Compound II wherein X is —OR.

Compound II is readily reduced by catalytic means and the resultant product is probably represented by the following formula

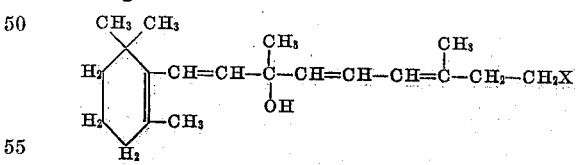

Compound III wherein X is —OR.

In the conversion of Compound II to Compound III, catalytic hydrogenation may be used, and in this case it has been found that poisoned palladium supported on calcium carbonate, Raney nickel, or poisoned Raney nickel are satisfactory. Raney nickel may be satisfactorily poisoned by a cadmium salt, a zinc salt which forms a soluble complex in methyl alcohol with an amine, piperidine, pyridine, thiourea, aminothiazoles, or a combination of zinc acetate and piperidine; however, Raney nickel poisoned by a combination of zinc acetate and piperidine is the preferred catalyst.

Compound III is stable in the absence of acidic substances and has vitamin A activity. Compound III, in the ether or alcohol form, may be simultaneously allylically rearranged and dehydrated to produce vitamin A.

The allylic rearrangement probably results in an intermediate compound having the formula

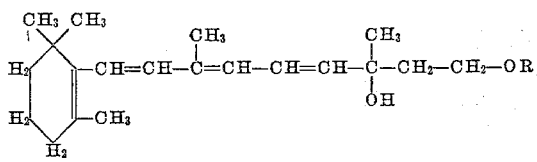

as well as an intermediate compound having the formula

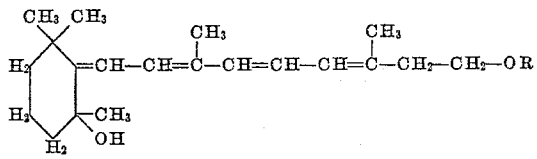

wherein R is a lower alkyl radical or hydroxyl. Dehydration of the first of these rearrangement products results in vitamin A and dehydration of the second results in retrovitamin A.

Suitable dehydrating agents include an acid chloride in an organic base and specifically benzoyl chloride in pyridine and acetyl chloride in dimethylaniline, glacial acetic acid, glacial acetic acid and potassium acetate, and aqueoue acetic acid; dehydration with the above reagents beeing accomplished at room temperature. Other dehydration reagents found suitable include toluene sulfonic acid in benzene, oxalic acid in benzene, glacial acid in benzene, catalytic quantities of iodine in benzene, and phenyl isocyanate in benzene; dehydration with these reagents being accomplished at the boiling temperature of benzene. When X in Compound I is —OR, the dehydration may be accomplished by heating in the presence of excess Grignard reagent in benzene at the boiling point of benzene or in a mixture of xylene and ether at a temperature of 55° C. to 60° C.

The following examples are given merely to illustrate specific ways in which the invention may be practiced, and it is to be understood that the invention is not to be restricted or limited thereby.

EXAMPLE I

*Isomerization of Compound I (methoxy) to form Compound II (methoxy)*

Compound I (methoxy) which was prepared from .04 mole of α-ethynyl-β-ionol was dissolved in 100 cc. of ten percent alcoholic sodium hydroxide. This solution was allowed to stand in the dark under nitrogen at room temperature for 48 hours and was then poured into a large excess of water, whereupon an oily material separated out; the oily material was extracted with petroleum ether. The petroleum ether was dried over anhydrous potassium carbonate and filtered, and the petroleum ether was removed under vacuum. The residue obtained was distilled at one micron of mercury pressure. Three fractions were obtained: fraction one distilled at from 60° C. to 106° C., weighed 1.7 grams, and had a refractive index at 25° C. of 1.5021; fraction two distilled at from 106° C. to 110° C., weighed 0.9 gram, and had a refractive index at 25° C. of 1.5108; and fraction three distilled at from 110° C. to 123° C., weighed 7.1 grams, and had a refractive index at 25° C. of 1.5328. The ultraviolet spectrum of fraction three showed an absorption band with a single maximum at 2300 A. and a molecular coefficient of extinction at that wave length of 20,800. It was a very viscous golden yellow liquid and upon analysis, carbon and hydrogen values of 79.70% and 10.12% respectively were found which correspond to theoretical carbon and hydrogen values for substances having a structure of Compound II (methoxy) of 79.69% and 10.19% respectively.

EXAMPLE II

*Catalytic hydrogenation of Compound II (methoxy) to form Compound III (methoxy)*

Compound II (methoxy), prepared according to Example I, was dissolved in five to ten times its volume of methanol and 2 cc. of pyridine and 6 grams of wet Raney nickel paste (Gilman Paint and Varnish Company) was then added. This mixture was shaken under hydrogen until the theoretical amount had been absorbed. After removal of the catalyst by filtration, the orange-red filtrate was poured into 5% brine solution and extracted with petroleum ether. The petroleum ether solution was washed once with 5% brine solution, dried over potassium carbonate, filtered, and the filtrate was concentrated at room temperature at 15–20 mm. of mercury pressure. The product was distilled at one micron of mercury pressure and three fractions were obtained: fraction one distilled at 105° C. to 109° C. and weighed 0.3 gram; fraction two distilled at 109° C. to 125° C. and weighed 9 grams, and had a refractive index at 25° C. of 1.5149; and fraction three distilled at 125° C. to 129° C., weighed 1 gram and had a refractive index at 25° C. of 1.5205. The ultraviolet spectrum of fraction two showed an absorption band with a maximum at 2370 A. and a molecular coefficient of extinction at this wavelength of 14,513. Carbon and hydrogen values, obtained by analysis of fraction two, of 78.74% and 10.77%, respectively, correspond to the theoretical values of 79.19% and 10.76%, respectively, for carbon and hydrogen for a substance having the formula of Compound III (methoxy).

EXAMPLE III

*Reaction of Compound III (methoxy) with glacial acetic acid*

5.8 grams of Compound III were dissolved in 50 cc. of glacial acetic acid at room temperature. The solution immediately turned deep orange amber in color. The flask was then flushed with nitrogen, stoppered tightly and allowed to stand at room temperature in the dark for twelve hours. The solution was poured into a large volume of water; the precipitated oil was extracted with petroleum ether (boiling point 30° C. to 60° C.). The petroleum ether solution was washed with water and dilute alkali, dried over anhydrous potassium carbonate, filtered, concentrated under vacuum, and distilled at one thousandth of a millimeter of mercury pressure. There were obtained 5 grams of material whose refractive index at 25° C. was 1.5723. The ultraviolet spectrum of this compound showed an absorption band with maxima at 3020 A., 3200 A., and 3320 A., and an inflection at 3460 A. Carbon and hydrogen values determined by analysis agreed closely to the corresponding theoretical values for vitamin A methyl ether.

EXAMPLE IV

*Reaction of Compound III (methoxy) with methyl magnesium iodide*

5.8 grams of Compound III (methoxy) were dissolved in 100 cc. of dried xylene and 15 cc. of 2.0 normal methyl magnesium iodide were added. The solution turned black upon the addition of the first few drops, then on further addition of Grignard reagent the color gradually lightened with the appearance of a precipitate which appeared to be in a rather granular state. The temperature rose to 45° C. spontaneously. When the methyl magnesium iodide was completely added, the color was light amber. To this solution was added 50 cc. of dry ether and the mixture was refluxed at a temperature of 55° C. to 60° C. for three hours. The mixture was then cooled and excess ammonium acetate solution was added. The ether-xylene layer was separated, dried, filtered, and concentrated under vacuum. The residue was distilled at one thousandth of a millimeter of mercury pressure. The bulk of the product had a refractive index at 20° C. of 1.5872. The ultraviolet spectrum of the product showed an absorption band with a maximum at 3300 A. with inflections at 3020 A. and 3200 A. Carbon and hydrogen values found by analysis agreed closely with the corresponding values for vitamin A methyl ether.

EXAMPLE V

*Dehydration of Compound III (methoxy) with anhydrous oxalic acid*

Ten grams of Compound III (methoxy) were dissolved in 200 cc. of benzene, and 300 milligrams of anhydrous oxalic acid were added. The mixture was refluxed with a water separator and after one hour the product appeared to be completely dehydrated as indicated in the marked decrease of water coming off. It was refluxed and the benzene solution was washed with dilute alkali and dried over anhydrous potassium carbonate, filtered, concentrated under vacuum, and distilled at one thousandth of one millimeter of mercury pressure. The product was a clear golden yellow liquid and had a refractive index at 20° C. of 1.62. The ultraviolet spectrum of this product showed an absorption band with maxima at 3320 A., 3480 A., and 3670 A., and molecular coefficients of extinction at these wavelengths of 29,817; 32,040; and 23,028 respectively. Carbon and hydrogen values obtained by analysis correspond closely to the theoretical values for carbon and hydrogen for a compound having the structure of Compound III (methoxy). When fed to vitamin A deficient rats, this compound showed exactly the same effects as natural vitamin A.

EXAMPLE VI

*Dehydration of Compound III (methoxy) with glacial acetic acid*

Five grams of Compound III (methoxy) were dissolved in 50 cc. of glacial acetic acid containing 5 grams of dissolved anhydrous potassium acetate. The solution was stirred at room temperature under nitrogen and in the dark from 12 to 24 hours and then poured into a large volume of water, whereupon the oily material separated out; the oily material was extracted with petroleum ether, the petroleum ether was washed well with dilute alkali, dried with anhydrous potassium carbonate, and filtered; the petroleum ether was then removed under vacuum. The residue was distilled at .001 mm. of mercury pressure. After a small forerun of 0.3 gram was arbitrarily removed, the remaining distillate was collected between 110° C. and 135° C. The distillate was a viscous golden yellow liquid and had a refractive index at 20° C. of 1.603. The ultraviolet spectrum of the distillate showed an absorption band with three maxima, at 3320 A., 3470 A., and 3650 A., and molecular coefficients of extinction at these wavelengths of 23,964; 28,227; and 20,582 respectively. This product was fed to vitamin A deficient rats and demonstrated vitamin A activity. Results of a carbon and hydrogen analysis agreed closely with the theoretical values for vitamin A methyl ether.

EXAMPLE VII

*Dehydration of Compound III (methoxy) with paratoluene sulfonic acid*

4.2 grams of Compound III (methoxy) were dissolved in 100 cc. of benzene. Two milligrams of paratoluene sulfonic acid were then added, and the mixture was refluxed; within three minutes an abundance of water droplets separated out in the water separator which was attached to the reflux condenser. After approximately fifteen minutes no more water was collected; the amount of water present in the water separator indicated that dehydration was complete. The mixture was refluxed ten to fifteen minutes longer, cooled, washed with dilute alkali, dried over anhydrous potassium carbonate, filtered, and concentrated. The benzene was removed under vacuum. The residue was distilled at .002 mm. of mercury pressure and distilled completely leaving no residue. The distillate had an index of refraction at 20° C. of 1.618. The ultraviolet spectrum of the distillate showed an absorption band with three maxima: 3320 A., 3480 A., and 3670 A. with molecular coefficients of extinction at these wavelengths of 29,369; 33,143; and 24,687 respectively. When fed to vitamin A depleted rats, this product showed vitamin A activity. Results of carbon and hydrogen analysis agreed closely with the theoretical values for vitamin A methyl ether.

This application is a continuation-in-part of my application Serial No. 777,862, filed October 3, 1947, now Patent No. 2,674,621.

What is claimed is:

1. A process for the synthesis of compounds having vitamin A activity which comprises treating a compound of the formula

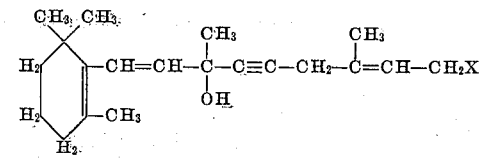

wherein X is selected from the group consisting of —OR and

and R is a lower alkyl radical, with a strongly alkaline reagent whereby a compound having the formula

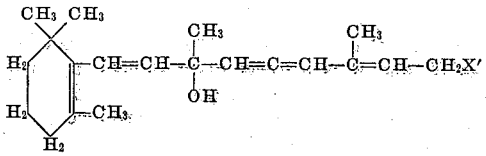

wherein X' is selected from the group consisting of —OR and —OH, and R is a lower alkyl radical, is produced.

2. A method according to claim 1 in which X is —OCH₃.

3. A process for the synthesis of compounds having vitamin A activity which comprises treating a compound of the formula

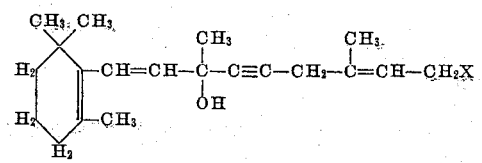

wherein X is selected from the group consisting of —OR and

and R is a lower alkyl radical, with a strongly alkaline reagent whereby a compound of the following formula,

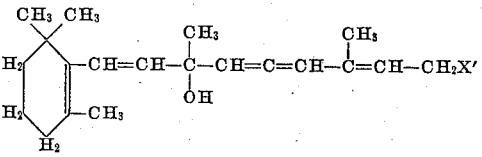

wherein X' is selected from the group consisting of —OR and —OH, and R is a lower alkyl radical, is produced, hydrogenating whereby two atoms of hydrogen are added, and a compound of the formula

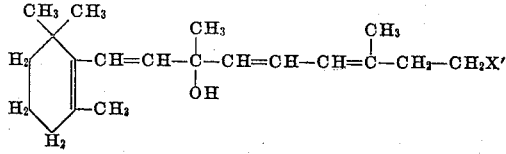

wherein X' is selected from the group consisting of —OR and —OH, and R is a lower alkyl radical, is produced.

4. A process according to claim 3 in which X is —OCH₃.

5. A process according to claim 3 in which the strongly alkaline reagent is sodium methoxide in methyl alcohol.

6. A process according to claim 3 in which the strongly alkaline reagent is sodium hydroxide in ethyl alcohol.

7. A process for the synthesis of vitamin A which comprises treating a compound of the formula

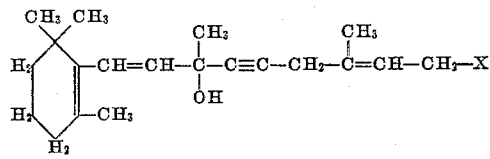

wherein X is selected from the group consisting of —OR and

and R is a lower alkyl radical, with a strongly alkaline reagent, whereby a compound of the following formula is produced,

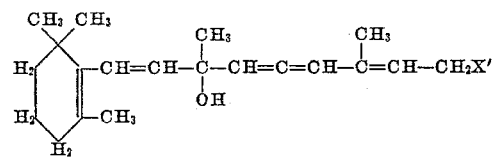

wherein X' is selected from the group consisting of —OR and —OH, and R is a lower alkyl radical, hydrogenating whereby two atoms of hydrogen are added and a compound of the following formula is produced

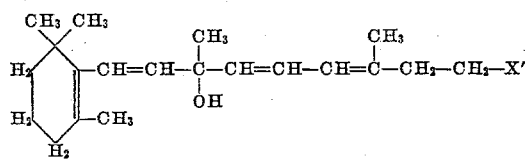

wherein X' has the same significance as above, and treating the last compound with an acidic substance whereby isomerization results in the formation of an intermediate compound of the formula

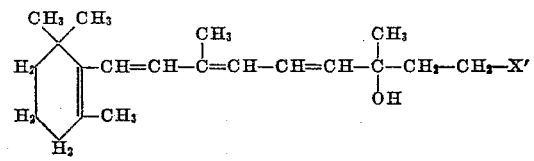

in which X' has the same significance as above, and dehydrating to produce a compound selected from the group consisting of vitamin A and vitamin A ethers.

8. A process according to claim 7 in which X and X' are —OCH₃.

9. A process according to claim 7 in which the strongly alkaline reagent is sodium methoxide in methyl alcohol.

10. A process according to claim 7 in which the strongly alkaline reagent is sodium hydroxide in ethyl alcohol.

11. A compound of the formula

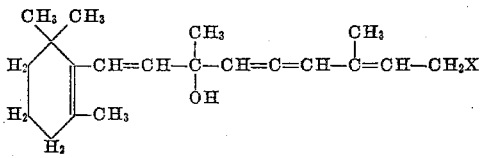

in which X is selected from the group consisting of —OR and —OH, and R is a lower alkyl radical.

12. A compound of the formula

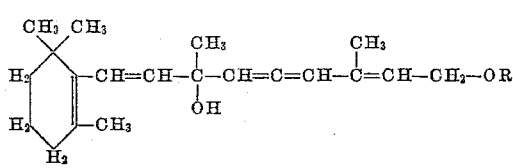

in which R is a lower alkyl radical.

13. A compound of the formula

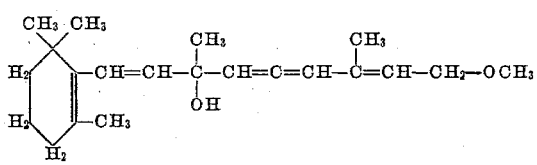

References Cited in the file of this patent
UNITED STATES PATENTS
2,602,092     Oroshnik _____ July 1, 1952

UNITED STATES PATENT OFFICE

CERTIFICATE OF CORRECTION

Patent No. 2,834,813           May 13, 1958

William Oroshnik

It is hereby certified that error appears in the printed specification of the above numbered patent requiring correction and that the said Letters Patent should read as corrected below.

Column 1, line 49, for "have" read --having--; column 3, line 22, for "retrovitamin A" read --retrovitamin A--; lines 26 and 27, for "aqueoue" read --aqueous--; line 30, for "glacial acid" read --glacial acetic acid--.

Signed and sealed this 8th day of July 1958.

(SEAL)
Attest:

KARL H. AXLINE             ROBERT C. WATSON
Attesting Officer             Commissioner of Patents